United States Patent [19]

Spieldiener et al.

[11] Patent Number: 4,543,886

[45] Date of Patent: Oct. 1, 1985

[54] AMUSEMENT RIDE INCLUDING A ROTATING LOADING TERMINAL

[75] Inventors: Robert Spieldiener, Uetikon am See; Reinhold Spieldiener, Herrliberg; Alfons Saiko, Oberrieden, all of Switzerland

[73] Assignee: Intamin Inc., Berkeley, Calif.

[21] Appl. No.: 473,812

[22] Filed: Mar. 9, 1983

[51] Int. Cl.⁴ .......................... A63G 3/02; B61K 1/00
[52] U.S. Cl. ........................................ 104/53; 104/21; 104/59; 104/73
[58] Field of Search ............... 104/18, 20, 21, 69–73, 104/59, 165, 168, 53; 198/394, 607

[56] References Cited

U.S. PATENT DOCUMENTS

| | | | |
|---|---|---|---|
| 1,859,267 | 5/1932 | Kurz | 104/73 |
| 2,947,263 | 8/1960 | Vidmar | 104/168 |
| 3,039,402 | 6/1962 | Richardson | 104/168 |
| 3,415,350 | 12/1968 | Murphy | 198/394 |
| 3,830,161 | 8/1974 | Bacon | 104/70 |
| 3,865,041 | 2/1975 | Bacon | 104/18 X |
| 4,120,391 | 10/1978 | Molins et al. | 198/607 X |
| 4,164,281 | 8/1979 | Schnier | 198/394 |
| 4,257,151 | 3/1981 | Coots et al. | 198/394 X |
| 4,416,368 | 11/1983 | Muramatsu et al. | 198/607 X |

FOREIGN PATENT DOCUMENTS 345212 12/1921 Fed. Rep. of Germany ........ 104/59

Primary Examiner—Randolph A. Reese
Attorney, Agent, or Firm—Bielen & Peterson

[57] ABSTRACT

An amusement ride loading terminal having a revolving circular platform is provided for continuous loading of passengers into a series of moving circular vehicles. The platform cooperates with an endless track conveyer to keep the vehicles revolving with the platform without individual vehicles spinning or rotating on their own axis. The conveyer has a vertically disposed conveying surface with an arcuate contact portion displaced from and concentric with the periphery of the circular platform. The track conveyer is operated to provide an arcuate velocity to the contact surface equal to the equivalent extended diameter of the circular platform, wherein the vehicles engage the periphery of the platform and the arcuate contact portion of the conveyer and are moved with the platform a portion of a revolution without roll or spin, for convenient loading of passengers into vehicles.

7 Claims, 5 Drawing Figures

AMUSEMENT RIDE INCLUDING A ROTATING LOADING TERMINAL

BACKGROUND OF THE INVENTION

This invention relates to a revolving loading platform and in particular to a platform that operates in combination with an endless track conveyer to transport vehicles against the revolving platform for convenient loading.

The field of revolving loading platforms was rapidly developed during the advance of rail transportation in the late nineteenth and early twentieth century. Revolving loading platforms were proposed for self-propelled or cable operated trains. In general the cars of the trains were mechanically linked to the revolving platform. Because of the size of passenger trains, the revolving loading platform was a complex engineering endeavor and somewhat impractical.

However, when applied to the smaller scale mechanical ride systems of a modern amusement park, many of the principles and concepts devised for passenger trains are feasible and can be incorporated into a small limited passenger terminal. For example, the amusement ride rail system of Bacon, U.S. Pat. No. 3,865,041, utilizes a rotating platform with a deformable peripheral bumper that frictionally engages the side of a passenger vehicle with wheels that engage a stationary arcuate rail to urge or maintain the vehicle against the platform bumper. While suitable for some type of vehicles the complex rail system of Bacon requires special engagement means on the vehicles which may interfere with the preferred means of the conveyance of the vehicle during the ride sequence. For example the floating boats of Bacon incongruously include wheels. Further, the loading system proposed by Bacon is not suitable for certain varieties and configurations of vehicles such as circular, free-floating rafts.

SUMMARY OF THE INVENTION

The amusement ride loading terminal of this invention is primarliy devised for use with a circular floating raft. The design of a modern raft ride for an amusement park attempts to duplicate natural settings. The waterway is therefore designed with rapids, twists and turns to simulate a natural river. The raft is free-floating, buoyant and preferably circular to provide all occupants with an equal thrill as the raft freely floats down the water course. In each new run, the raft does not have the same orientation or exact course as in prior runs. To maintain the effect of a substantially unrestrained flotation vehicle, a unique loading terminal was devised.

The loading terminal combines a circular revolving passenger platform with an arcuate conveyer, vertically disposed and displaced from the outer edge of the platform. The floatation vehicle or raft floats on a water course to the platform and conveyer where it becomes wedged between them and transported against the platform for a portion of a platform revolution. The outer periphery of the raft is deformable, preferably a pneumatic, annular floatation device. To prevent the circular raft from rolling against the platform the arcuate portion of the conveyer in contact with the raft is operated at a linear speed equal to the equivalent extended diameter of the platform were it at the location of the arcuate contact portion of the conveyer. With respect to the axis of the platform, the platform, raft, and contact portion of the conveyer all have the same angular velocity.

Passengers wishing to board a raft, first step onto the stationary center of the platform. Passengers then step from the stationary center to the inner section of the revolving portion of platform where the circumferential speed is small. The passengers therefore step on a very slow running area with relative safety. Once on the moving platform, they walk outward towards the outer circumference where the rafts are positioned. At this point, the speed is high and equal to the speed of the boats. Therefore, the transition from a low entrance speed to the relatively high or normal running speed of the boats is effected safely which is the essence of the rotating circular platform. On boarding, the relative speed of the passenger and raft are essentially the same. The raft is steadied by its frictional engagement with the periphery of the platform and contact segment of the conveyer, yet retains sufficient characteristics of an independent floatation vehicle to impress the boarding passenger with the realistic nature of the impending ride.

For full utilization of the combination platform and conveyer system devised, other features are includible where the vehicle has specific or limited boarding avenues. For example, where a circular raft has one zone of its periphery dedicated for boarding or egress, this zone must be oriented against the revolving platform during the boarding or unloading process. To accomplish this select orientation a short, vertically disposed conveyer segment is independently operated at a speed having an angular equivalent different than the revolving platform. In this manner a roll is deliberately applied to the circular raft to cause it to orient the boarding zone against the platform. Once this orientation is achieved, the conveyer segment is operated at the proper speed to maintain the desired raft orientation as it is transported around with the revolving platform.

These and other features which contribute to the efficient loading facility of this invention are described in greater detail in the detailed description of the preferred embodiment.

DETAILED DESCRIPTION OF THE PREFERRED EMBODIMENTS

Figure 1:
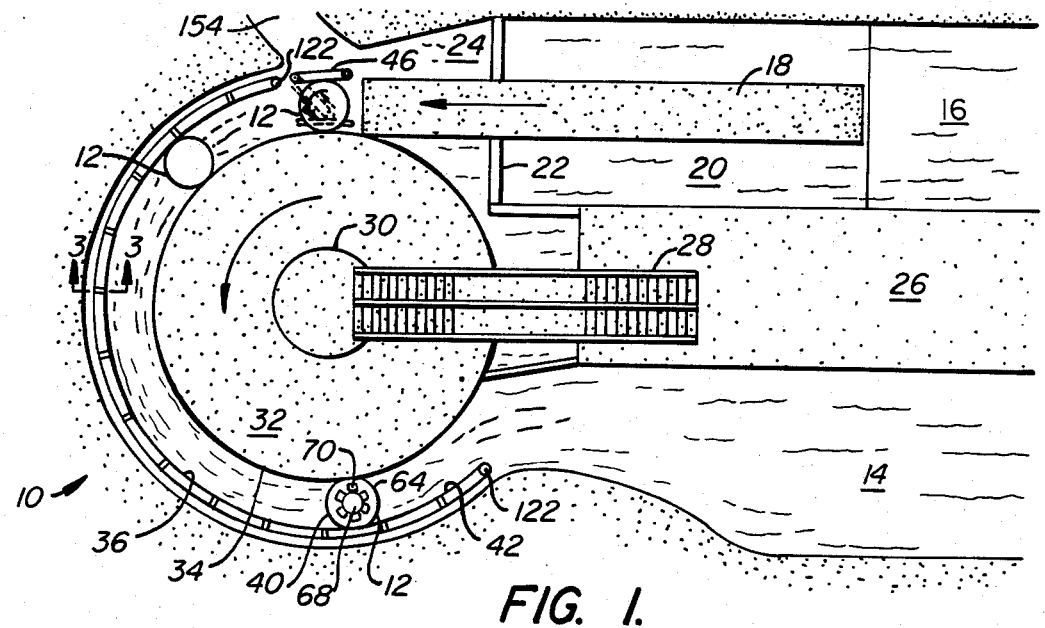
FIG. 1 is a schematic plan view of the passenger loading terminal of this invention.

Referring to FIG. 1 a passenger loading terminal, designated generally by the reference numeral 10 is shown. The loading terminal is particularly designed and constructed for continuous loading of amusement park passengers into independent floatation vehicles or rafts 12 for a simulated river raft ride. A water course 14, of which only a part is shown, begins and terminates at the terminal.

At the termination area 16 of the water course, a raft 12 is engaged by a conventional belt conveyer 18 which carries the raft up an incline 20 and over a barrier wall 22 into an upper level waterway 24 where passengers are unloaded and loaded.

Passengers approach the terminal on a walkway 26 and walk over a bridge 28 to a stationary center area 30 around which revolves a concentric platform 32. The platform 32 revolves at a relatively slow rate. Passengers can easily step onto the platform and walk to the outer peripheral edge 34 without any loss of balance. As the outer edge 34 has a linear speed greater than at the interface with the center area 30, a plurality of rafts can be efficiently and continuously loaded in rapid succession when moved along with the loading platform 32.

Cooperating with the platform 32 to move the rafts 12 is an arcuate conveyer 36 which is displaced from the outer peripheral edge 34 of the platform 32. The rafts 12 have an outer pneumatic annulus 40 with an outside diameter greater than the displacement distance between the peripheral edge of the platform and an inner arcuate contact portion 42 of the conveyer. On engagement with the platform edge 34 and contact portion 42 the rafts become wedged therebetween and conveyed in conjunction with the revolving platform. The inner arcuate contact portion of the conveyer 36 is operated at a speed equivalent to the extended diameter speed of the platform were it coincident with this portion of the conveyer. In this manner the rafts have the same angular velocity as the platform relative to the rotational axis of the platform and do not roll along the platform's edge 34.

Where the rafts 12 are not easily loaded from every orientation, for example, because of the location of seat backs 44, the rafts 12, are selectively oriented by a short orientation conveyer 46 at the start of their transport in the upper level waterway 24. By operating the orientation conveyer 46 faster or slower than the effective extended diameter velocity of the platform 32, the raft can be induced to roll against the peripheral edge of the platform and be oriented as desired.

Figure 2:
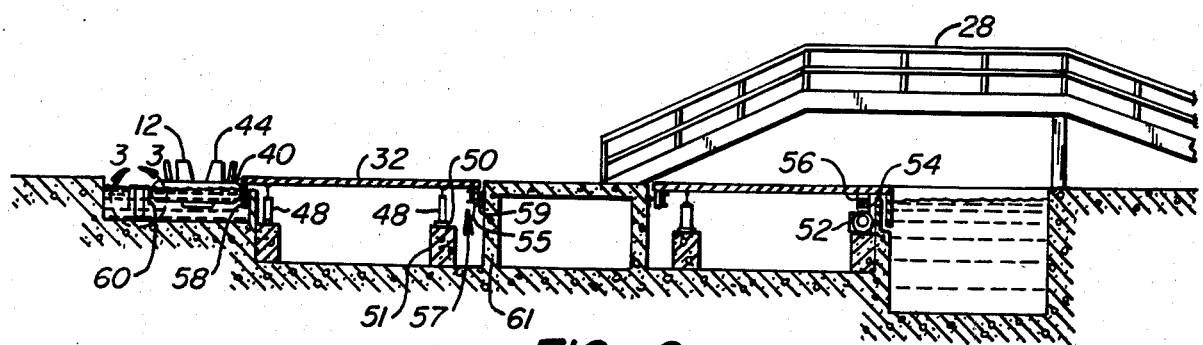
FIG. 2 is an elevational view of the terminal of FIG. 1.

Referring to FIG. 2, the annular platform 32 has a series of inner and outer tracking wheels 48 for supporting the platform on rail 50 mounted on concentric stationary supports 51. The platform 32 is rotated around the center area 30 by four circumferentially spaced variable speed electrical drive motors 52 with a friction wheel 54 that engages a circular friction plate 56 on the underside of the platform. A number of horizental guide wheels 55 mounted on the inner edge structure 57 of the rotating platform run against a stationery, circular guide rail 59 embedded in the upper edge of the circular center concrete structure 61 as shown in FIG. 2. The bridge 28 provides an elevated walkway over the platform to allow passengers on the platform to walk or be carried under the bridge without interference.

The peripheral edge 34 of the platform 32 has a contact perimeter of vertically mounted wooden slats or continuous steel plates 58 which cooperate with a series of vertically disposal wooden slats 60 on the conveyer 36 to oppositely engage the raft 12 wedged therebetween.

The raft 12 is fabricated with an outer pneumatic floatation bladder 64, that emcompasses a plastic shell 68. The shell 68 has a plurality of seats 70 for a designated number of passengers, here six. By appropriate rescaling to the terminal particularly the distance between platform and conveyer, larger or smaller rafts can be accomodated. It is naturally understood that the operating mechanisms here described can be applied to vehicles of other configuration or modes of transport, for example wheeled vehicles.

The wooden slats or steel plates on the platform and wooden slats on the conveyer provide a suitable contact surface for the pneumatic bladder, compressing the bladder slightly to generate the necessary traction for transport of the raft. The raft is thereby transported by the joint action of both the conveyer and platform. The slats 60 on the arcuate conveyer are mounted to upper and lower drive chains 62 shown in greater detail in FIG. 3.

Figure 3:
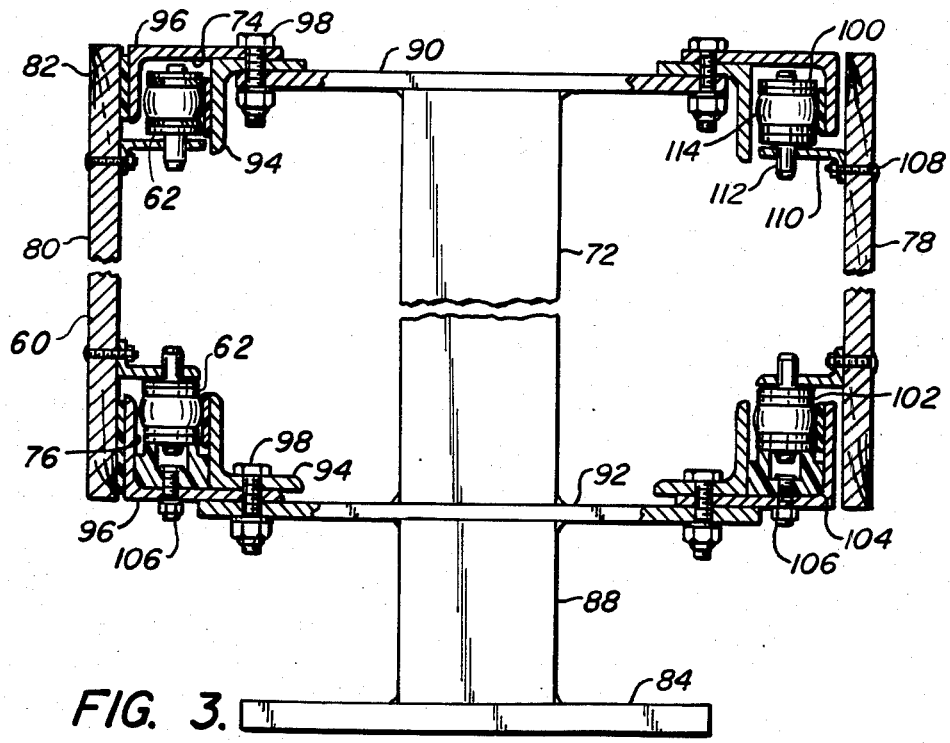
FIG. 3 is a cross sectional view of the conveyer in FIG. 1.

Referring to the cross sectional view of FIG. 3, a typical chain support stanchion 72 is shown. A plurality of stanchions 72 are uniformly spaced around the length of the arcuate conveyer for support of curved upper and lower guide channels, 74 and 76, and, the contact portion 78 and return portion 80 of the moving conveyer track 82.

The stanchion 72 is constructed with a base plate 84 for mounting the stanchion to the bed of the upper waterway 24. The base plate 84 has a vertical post 88 mounted thereto which supports upper and lower cross brackets 90 and 92 to which the guide channels 74 and 76 are attached. The guide channels are fabricated from sections of elongated curved L-beams, 94 and 96, which are welded together at their ends to provide the continuous arcuate conveyer configuration shown in FIG. 1. The inner and outer L-beams, 94 and 96, are jointly bolted to the cross brackets 90 and 92 by bolts 98.

The moving conveyer track 82 is constructed with an upper link chain 100 that is arranged within the upper guide channel 74 and a lower link chain 102, that is arranged within the lower guide channel 76. Chain 102 is transported on a low friction slide bearing 104 attached to the lower guide channel 76 by anchor bolts 106. The upper and lower link chains are interconnected by the vertical wooden slats 60 which are bolted by carriage bolts 108 to angle iron brackets 110 that connect to the journal pins 112 of the link chain rollers 114. In this manner the displacement of the upper and lower link chains 100 and 102 maintained by the slats 60.

Figure 4:
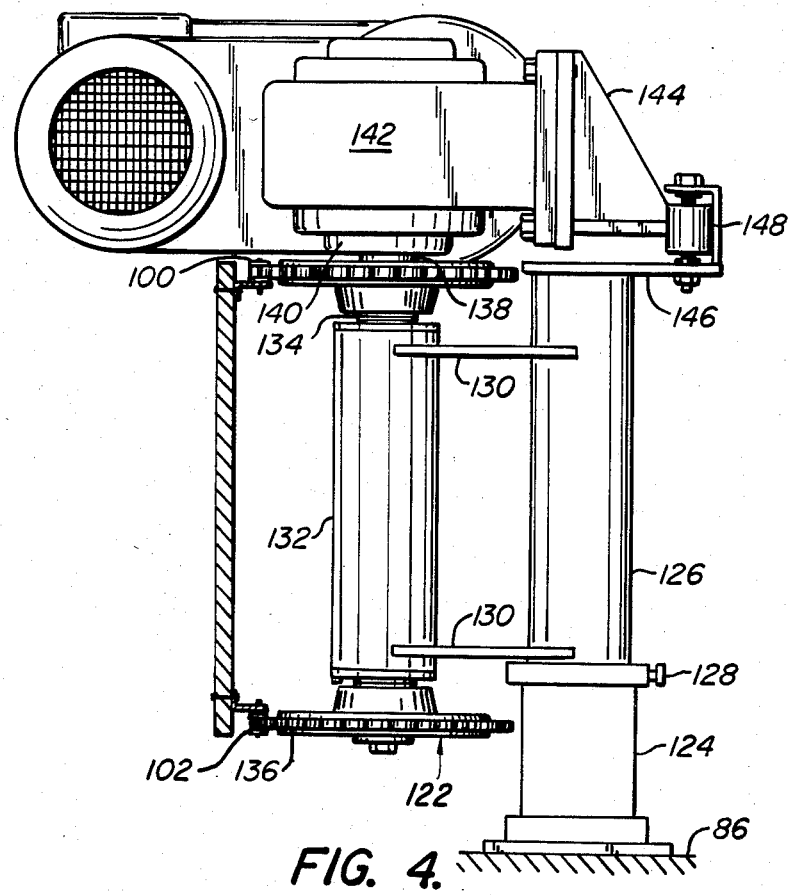
FIG. 4 is a cross sectional view of the main conveyer drive mechanism.

As schematically illustrated in FIG. 1, each end of the conveyer 36 includes a sprocket mechanism 122 to reverse the direction of the moving track 82. One end, for example the raft entry end, has a drive motor 142 connected to the sprocket mechanism 122. The sprocket mechanism including the drive motor is shown in FIG. 4. A socket 124 is mounted to the bed 86 of the upper waterway 24. A support post 126 is inserted in the socket and, for the main conveyer, is secured from rotation in the socket by a set screw 128. The support post 126 has two horizontal support arms 130 connected to a journal casing 132 in which a journal 134 is vertically mounted. The journal has a sprocket 136 at each end which engages the upper and lower link chains, 100 and 102. Extending from the journal at the top sprocket is a drive spindle 138 which is keyed to the rotor 140 of the variable speed electric motor 142. The motor 142 is supported on a bracket 144 connected to a top mounting plate 146 on the support post 126 by a shock mount 148.

Operation of the drive motor 142 for the conveyer is regulated by conventional control systems to coordinate conveyer speed with the speed of the contact portion 78 of the revolving platform to prevent roll of the rafts along the conveyer and platform. Thus, when platform rotation speed is increased or reduced according to passenger demand the conveyer speed is accordingly adjusted. By increasing or decreasing the speed of the conveyer relative to the equivalent angular speed of the platform, engaged vehicles will roll against the platform and reorient themselves for convenient loading or unloading. Preferably the orientation is accomplished by a separate mechanism described hereafter.

Figure 5:
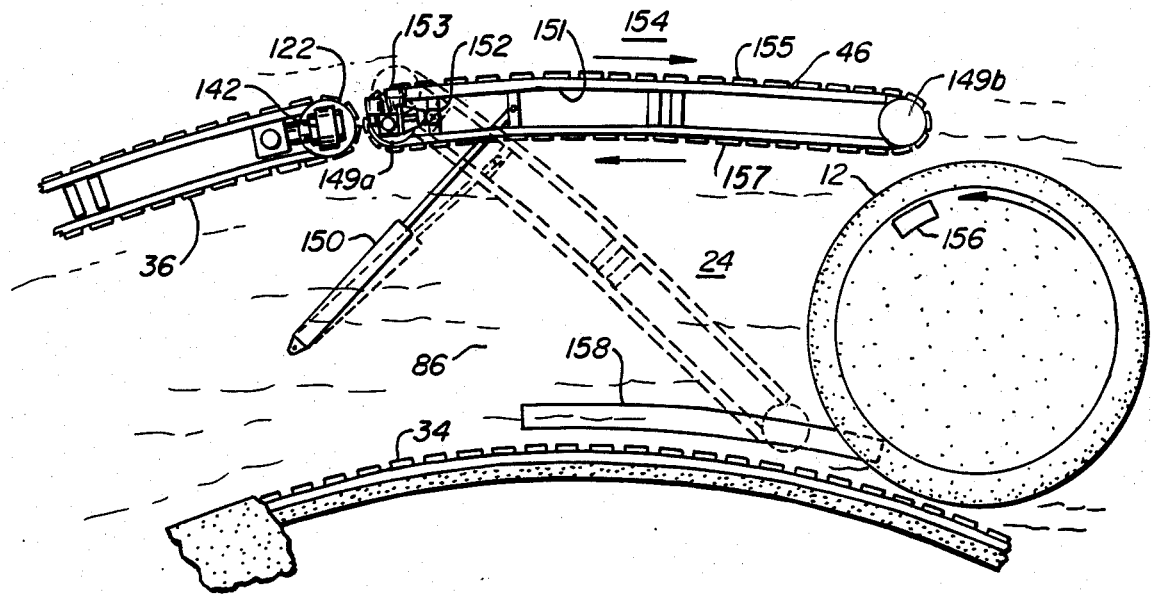
FIG. 5 is an enlarged plan view of the orienting conveyer.

The short orientation conveyer 46 includes a sprocket mechanism 149a and 149b at each end similar to that shown in FIG. 4. As illustrated in FIG. 5, the orientation conveyer 46 includes a hydraulic or pneumatic activation mechanism 150 mounted at one end to the bed 86 of the upper waterway 24 and at the other end to the conveyer 46 to pivot the conveyer 46 about the axis of the support post 152. In this manner the conveyer can be swung across the waterway to shunt selected rafts into a spur waterway 154 for removal from service. In such a system, the sprocket mechanism 149b the swinging end is not supported in a socket but includes a support roller at its bottom end (not shown). The support post 152 at the pivotal end being part of an interconnecting support structure 151, is not pinned by a set screw to its support socket, but is free to pivot therein.

In a usual situation the orientation conveyer 46 is employed to roll the raft by a differential in the effective angular speed of the conveyer relative to the platform by variations in the speed of a variable speed drive motor 153. The orientation conveyer 46 has a vertically disposed conveying surface 155 with a contact portion 157 displaced from the peripheral edge or circular periphery 34 of the platform. A raft 12 becomes engaged between the orientation conveyer and the platform and is rotated by an effective differential arcuate speed between the contact portion 157 of the conveyer 46 and the periphery 34 of the platform. Generally, the conveyer 46 is slowed or stopped until a strategically mounted detectable plate 156 is detected adjacent the platform by an elongated bed-mounted, sensor plate 158. When detected the appropriate compatible speed of the orientation conveyer to the platform is resumed, thus maintaining the selected proper positioning of the raft for unloading and loading.

While on the foregoing embodiments of the present invention have been set forth in considerable detail for the purposes of making a complete disclosure of the invention it may be apparent to those of skill in the art that numerous changes may be made in such detail without departing from the spirit and principles of the invention.

What is claimed is:

1. An amusement ride with a loading terminal for passenger loading of independent circular vehicles comprising; at least one vehicle having an outer peripheral surface that is circular in configuration, and, a loading terminal including a revolving platform with an outer circular periphery, and an endless track conveyer having a vertically disposed conveying surface with a vertically disposed arcuate contact portion displaced from and concentric with the outer circular periphery, wherein said contact portion is operable at an arcuate velocity substantially equal to an arcuate velocity of an equivalent extended diameter of said platform were it extended to said arcuate contact portion of said conveyor, wherein said vehicle is simultaneously engaged by both said conveyor and platform and transported without uncontrolled roll or spin by joint action of both said platform and conveyor around a portion of a revolution of the platform, wherein said platform, vehicle and contact portion of said conveyor all have a same angular velocity.

2. An amusement ride of claim 1 comprising further, control means for variable velocity operation of said conveyor wherein said circular vehicle is rolled against said platform on variation of the velocity of said conveyor from the equivalent extended diameter velocity of the platform for select orientation of said vehicle on their axis with respect to said platform for loading and unloading.

3. An amusement ride of claim 1 comprising further, a separate orientation conveyor having a vertically disposed conveying surface with a contact portion displaced from the outer circular periphery of said platform, wherein a vehicle is engageable between the contact portion of said conveyor and the outer circular periphery of said platform, and wherein said orientation conveyor has control means for operation of the contact portion of said conveyor at variable velocities, wherein the orientation of said vehicle relative to said platform is selectably adjusted for loading and unloading.

4. An amusement ride of claim 3 wherein said orientation conveyor has a first sprocket end and a second sprocket end with interconnecting support structure for endless tracking of said conveying surface, said first sprocket end having further, pivotal support means for pivoting said second sprocket end and support structure in an arcuate path toward said platform to shunt vehicles away from said platform.

5. The amusement ride of claim 4 wherein said support structure has connected thereto, means for activating the pivotal support means.

6. The amusement ride of claim 1 wherein a waterway is disposed between said outer circular periphery of said platform and said contact portion of said conveyer.

7. The amusement ride of claim 6 comprising further, control means for operating said conveyer at an arcuate velocity equal to the equivalent extended diameter of said platform.

* * * * *